July 24, 1951
M. H. INGELS ET AL
2,561,375
VARIABLE LENGTH RIP CORD, HOUSING
AND RIP CORD POCKET
Filed Dec. 17, 1948
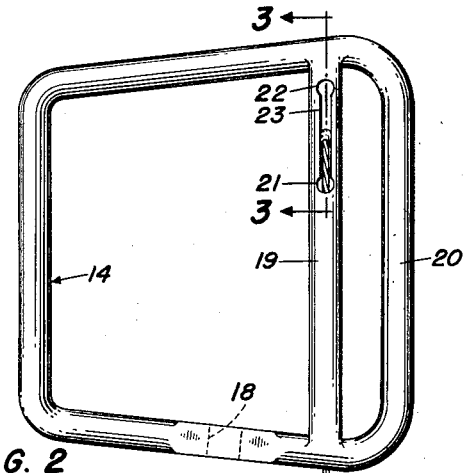
FIG. 2
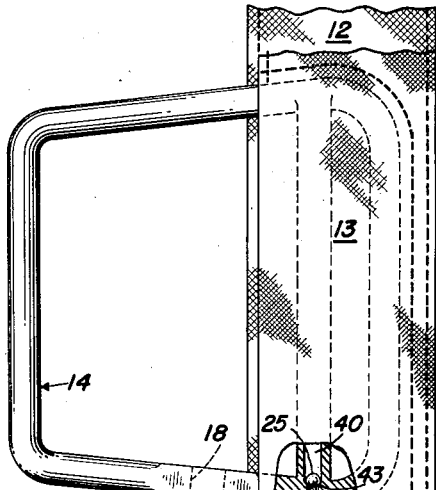
FIG. 3
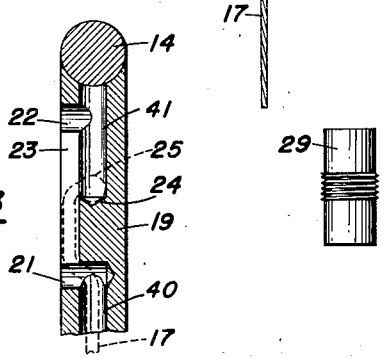
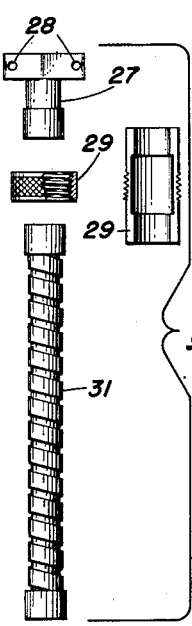
FIG. 4
FIG. 5
FIG. 1
Inventors
MARION H. INGELS
ANTHONY C. BINDER
By F. Schmutt
Attorney Patented July 24, 1951

2,561,375

UNITED STATES PATENT OFFICE 2,561,375

VARIABLE LENGTH RIP CORD, HOUSING, AND RIP CORD POCKET

Marion H. Ingels and Anthony C. Binder,
United States Navy

Application December 17, 1948, Serial No. 65,955

9 Claims. (Cl. 244—149)

(Granted under the act of March 3, 1883, as amended April 30, 1928; 370 O. G. 757)

The present invention relates to parachute rip cord apparatus and more particularly to parachute rip cord apparatus in which one rip cord may be used in either of two predetermined lengths without replacement of the rip cord and the housing therefor.

The standard seat service type parachute, when fitted with a life raft or other equipment, has been found unsuitable for service, due to the repositioning of the rip cord pocket when proper parachute adjustment is made. This position of the pocket, particularly on persons of large stature, is beyond the reach of the wearer. Furthermore, if the wearer of the parachute is clothed with conventional flight gear, the pocket and the rip cord handle become further inaccessible.

From the above, it is clear that a longer rip cord is required in order to accommodate the use of additional equipment with the parachute. As this long rip cord and housing are not needed when using the parachute without the life raft, or other equipment, it is apparent that a variable length rip cord and housing would attain the most efficient results. It has been determined that the additional length of rip cord necessary to meet these varying requirements is approximately four inches.

Accordingly, it is an object of the present invention to provide parachute rip cord apparatus which may be used conveniently in all cases, regardless of the equipment attached to the parachute, or the size of the wearer.

Another object is to provide parachute rip cord apparatus having a variable length rip cord and requiring a minimum amount of replacement or modification of standard rip cord apparatus.

A further object of the invention is the provision of parachute rip cord apparatus which may be used in either of two predetermined lengths without replacement of the rip cord and the housing therefor.

Still another object is to provide a variable length rip cord for a parachute wherein the excess length of the cord may be stowed where it cannot interfere with the normal operation of the rip cord apparatus.

Other objects and many of the attendant advantages of this invention will be readily appreciated as the same becomes better understood by reference to the following detailed description when considered in connection with the accompanying drawing wherein:

Fig. 1 shows a plan view, parts thereof being shown in section, of a preferred embodiment of the invention attached in extended position to a strap of the parachute harness.

Fig. 2 is a plan view of the rip cord handle of Fig. 1 with the rip cord in shortened position thereon.

Fig. 3 is a section taken along the line 3—3 of Fig. 2 illustrating the rip cord in place in shortened position.

Fig. 4 is an exploded view of the fitting and extension connections of Fig. 1; and Fig. 5 illustrates a modification of the rip cord handle.

Referring now to the drawings, wherein like reference characters designate like or corresponding parts throughout the several views, there is shown in Fig. 1, which illustrates a preferred embodiment, a parachute rip cord apparatus, designated generally as 11, in place on a strap 12 of a parachute harness, rip cord apparatus 11 comprising a pocket 13 sewn, or otherwise secured, to strap 12, a rip cord handle 14 positioned in pocket 13, and a rip cord housing or cable 15 slidably attached to strap 12 by threads 16, cable 15 containing the rip cord 17.

Rip cord handle 14 is of metallic stock and has a generally trapezoidal frame, there being a slot 18 in one side thereof through which rip cord 17 passes in the conventional rip cord apparatus. According to the preferred embodiment of the present invention, a bar 19, preferably of metallic stock machined in a manner to be described, is welded or otherwise secured to the sides of the frame of handle 14 parallel to and adjacent the long parallel side 20 of handle 14.

Bar 19 is preferably turned from solid stock, and before securing it in place in the handle 14, two holes 21 and 22 are drilled therein and then joined by milling a slot 23 between them. The bar 19 is then drilled up from the bottom, forming a bore 40, to a point just through the lower hole 21, and drilled down from the top forming a bore 41, through the top hole 22 and half way down the slotted section 23, leaving a seat 24 between the holes on which the swaged ball 25 of the rip cord 17 rests when the rip cord is in the sortened position (see Fig. 3). The lower side of handle 14 has an aperture 42 therein, the upper end of which is counter bored to form a seat 43. Bar 19 is then secured in position between the upper and lower sides of the handle in parallelism with side 20, with bore 41 in axial alignment with bore 42. It will be noted that bore 41 terminates adjacent and in alignment with seat 43. In the extended position of the rip cord, as shown in Fig. 1, swaged ball 25 rests in the bottom of bar 19 in seat 43. The rip cord is made about four or four and one half inches longer than standard in order to use it in both positions.

The end of the rip cord is then inserted through bore 42, upwardly through bore 40, and out hole 21. Ball 25 is then secured to the end of the rip cord. The two holes 21 and 22 and bores 40 and 41 are of sufficient size to permit swaged ball 25 to pass therethrough, said ball being secured to the end of the rip cord after bar 19 has been secured in place to prevent accidental burning of the cord or destruction thereof due to heat in securing the bar to the handle. The aperture in the lower side of handle 14 is large enough to permit rip cord 17 to pass therethrough, but small enough to prevent passage of ball 25 therethrough. Slot 23 connecting holes 21 and 22 is made of sufficient width and depth to allow the rip cord to remain straight at all times.

It should be understood that it is possible to utilize side 20 of handle 14 rather than the additional bar 19, since the handle 14 would have sufficient strength if side 20 were hollow. However, since side 20 of handle 14 is inserted in pocket 13 adjacent the end thereof, it was found that it would be difficult to align the rip cord 17 and cable 15 along the center of strap 12 and still maintain a smooth transition between the portion of the cord within the handle 14 and the external portion so as to prevent snagging of premature release.

In order to adapt the rip cord handle and cable for use with a conventional pocket it was found necessary to modify the pocket to some extent. Thus a hole 26 was punched in the bottom of pocket 13, centrally thereof, but this alone was found unsatisfactory, as the housing or cable had to be held firmly in place at the bottom of the rip cord pocket. To overcome this difficulty, an oval metal fitting 27, shown in detail in Fig. 4, having a hole 28 in each side thereof, is fitted into the bottom of pocket 13 and held in position, as shown in Fig. 1, by sewing to the pocket 13 and strap 12, holes 28 being used for this purpose. Fitting 27 terminates in a section with substantially the same size and shape as cable 15, and is attached to cable 15 by means of a split connector 29, the details of which are shown in Fig. 4. Split connector 29 connects fitting 27 to a cable extension section 31 which is connected by another split connector 29 to the major section of cable 15 (see Fig. 1).

This type of construction permits complete interchangeability of connecting parts and eliminates the exposed rip cord between the cable or housing and the pocket. It also eliminates any variation in the distance between the housing and the pocket when packing, as the housing is always connected directly to the pocket. The construction also removes the housing or cable from the front edge of the webbing below the pocket and places it in the center of the webbing directly below the pocket as shown in Fig. 1.

In using the apparatus of the present invention, the rip cord may be attached in its extended position, as shown in Fig. 1, with extension 31 of the cable or housing connected to fitting 27 by means of one connector 29, and attached to the other portion of the cable or housing by means of the other connector 29, swaged ball 25 being in its lower position. When it is desired to use the shorter length of rip cord, the rip cord pins are removed from their positions in the parachute and the handle 14 and cord 17 are removed. Connectors 29 are unfastened and extension 31 is detached, swaged ball 25 being pulled back to its other position on seat 24. The apparatus is then reconnected and is ready for use in its shorter length.

Referring now to Fig. 5, there is shown a modification of the rip cord handle wherein a bar 59, similar to bar 19 in all constructional details, is welded or otherwise secured to the handle 54 in a diagonal position extending from the conventional slot 58 to the opposite corner 51. Rip cord 57 is passed through slot 58 and through tube 59 and is held in either position in the same manner as that described in the embodiment of Fig. 1.

The handle structure of Fig. 5 eliminates the necessity of additionally altering the conventional structure, since the original slot is used. However, this embodiment does not provide the centrally positioned rip cord housing or cable, or the detachable connection therefor. In either case the bar is positioned sufficiently distant from the protruding side of the handle frame to permit easy insertion of the gloved hand of the wearer.

Obviously, many modifications and variations of the present invention are possible in the light of the above teachings. It is, therefore, to be understood, that within the scope of the appended claims, the invention may be practiced otherwise than as specifically described.

The invention described herein may be manufactured and used by or for the Government of the United States of America for governmental purposes without the payment of any royalties thereon or therefor.

What is claimed is:

1. In a parachute harness rip cord apparatus having a rip cord and a rip cord handle, a tubular member secured to said handle and having a pair of spaced openings adjacent one end thereof connected by a slot, a seat member in said tubular member and positioned intermediate said openings, said cord extending through said handle and said member and arranged to be held in either of two positions, one position being against said seat member and the other being at the other end of said tubular member.

2. The combination according to claim 1, wherein said tubular member is positioned adjacent one side of said handle.

3. The combination according to claim 1, wherein said tubular member is positioned substantially parallel to and adjacent one side of said handle.

4. In combination with a parachute harness having a strap, a pocket secured to said strap, a rip cord handle detachably positioned in said pocket and having a portion thereof extending outwardly therefrom, guide means secured in the bottom portion of said pocket and having a portion thereof extending outwardly therethrough, a rip cord cable extending through said handle, and means on said guide means and said handle for holding said cable in either of two positions.

5. In combination with a parachute harness having a strap, a pocket secured to said strap, a rip cord handle detachably positioned in said pocket and having a portion thereof extending outwardly therefrom, a fitting secured in the bottom portion of said pocket and extending outwardly therethrough, a rip cord cable extending through said fitting and said handle, means on said handle for retaining said cable in either of two positions, and a housing for said cable connected to said fitting.

6. The combination according to claim 5, wherein said means comprises a tubular member secured to said handle.

7. The combination according to claim 6, wherein said tubular member is positioned within said pocket and in substantial alignment with said fitting.

8. The combination according to claim 5, wherein said cable housing comprises a pair of detachably connected portions, one of said portions being detachably connected to said fitting.

9. A parachute rip-cord handle assembly comprising a hollow grip, a cable carried slidably in said grip, and means to secure the end of said cable at each of more than one position within said grip.

MARION H. INGELS.
ANTHONY C. BINDER.

REFERENCES CITED

The following references are of record in the file of this patent:

UNITED STATES PATENTS

| Number | Name | Date |
|---|---|---|
| 2,164,130 | Waite et al. | June 27, 1939 |